United States Patent [19]

Kwast et al.

[11] 4,027,373
[45] June 7, 1977

[54] FLANGE SPREADER

[75] Inventors: Theodore Emil Kwast, Anaheim; Gordon Marlon Smith, La Habra Heights, both of Calif.

[73] Assignee: The Singer Company, New York, N.Y.

[22] Filed: July 20, 1976

[21] Appl. No.: 707,134

[52] U.S. Cl. .................................. 29/256; 29/238; 29/239; 29/427

[51] Int. Cl.² ........................................ B23P 19/04

[58] Field of Search ........... 29/256, 238, 239, 263, 29/264, 265, 427, 426, 258, 282, 283; 254/29 R, 65; 228/44.5, 49; 269/43

[56] References Cited

UNITED STATES PATENTS

| 864,166 | 8/1907 | Herrick | 29/238 |
|---|---|---|---|
| 1,305,805 | 6/1919 | Jones | 29/239 |
| 1,831,082 | 11/1931 | Spilsbury | 29/238 |
| 1,894,835 | 1/1933 | Smith et al. | 29/238 |
| 2,161,013 | 6/1939 | Breza | 29/239 |

*Primary Examiner*—James R. Duzan
*Attorney, Agent, or Firm*—Edward L. Bell; Robert E. Smith; Harold Weinstein

[57] ABSTRACT

A method and apparatus for removing a flow control device mounted between two opposed flanges of a pipeline wherein the flanges are clamped together by a plurality of studs. The method comprises the steps of clamping a pair of axially expandable flange spreaders to hold the opposed flanges in axial aligned position. Next, all of the studs are removed or loosened to permit access to the flow control device. Stop means are appended to the flange spreaders at the inside basis of the flanges. Lastly, the flange spreaders are expanded to permit removal of the flow control device from the pipeline. Reversal of the procedure will permit reassembly of the pipeline.

Each of the flange spreaders comprises a pair of interconnected members that are axially expandable or contractable, and initially are clamped in position to hold the opposing flanges in axial alignment. The stop means will be appended to the members to engage the inner face of the opposing flanges whereby on axially expanding the flange spreaders the opposing flanges will be axially forced apart. The flange spreaders may include a jackscrew threadedly connected to a base having a portion abutting the inner face of one of the flanges, and a jackscrew stop adapted to be connected to the jackscrew to abut the inner face of the other flange.

4 Claims, 9 Drawing Figures

FLANGE SPREADER

BACKGROUND OF THE INVENTION

In the prior art various devices have been used wherein the alignment of the pipe flange sections and the flange spreading thereof have been separately treated, so that more than one device would be required. Alternately a flange spreader of complex structure with or without the alignment feature was used which required a clamping feature to enable the device to be connected to the pipe sections.

SUMMARY OF THE INVENTION

It is an object of the present invention to provide an improved flange spreader which overcomes the prior art disadvantages; which is simple, economical and reliable; which includes a pair of interconnected members axially expandable or contractable with reference to the opposed flanges of the pipeline; which includes a jackscrew threadedly received on a base and a jackscrew stop means appended thereto; which includes a base abutting the inner face of one of the pipeline flanges; which includes a method of clamping a pair of axially expandable flange spreaders to the opposed flanges of a pipeline; which includes clamping a pair of flange spreaders in place of a pair of studs removed from the opposed flanges; and which includes the method of clamping the flange spreaders to hold the opposed pipeline sections in alignment, and then spreading the flanges axially apart in such aligned position.

Other objects and advantages will be found from the following description of one embodiment of the invention and the novel features will be particularly pointed out hereinafter in the claims.

BRIEF DESCRIPTION OF THE DRAWINGS

This invention is illustrated in the accompanying drawings in which.

DESCRIPTION OF THE INVENTION

Figure 1:
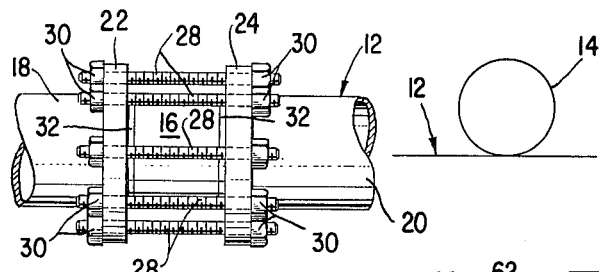
FIG. 1 is a side elevational view of an assembled pipeline, in which a flow control device is mounted between two opposed flanges, and including a diagrammatic expansion loop therein.
Figure 2:
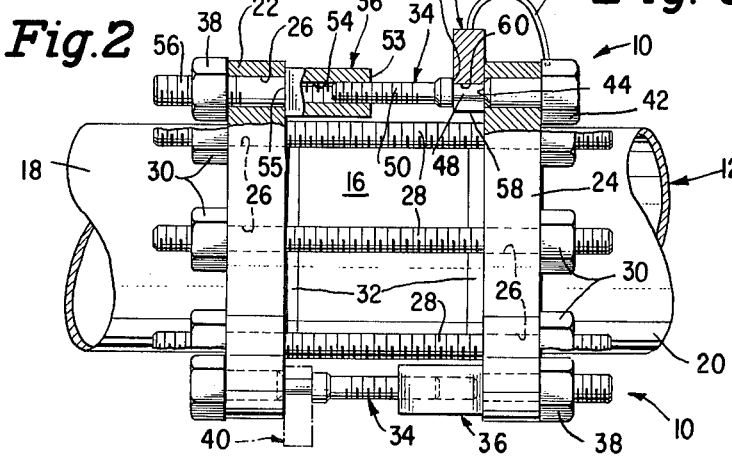
FIG. 2 is an enlarged top plan view, partly in section, of the two opposed flanges to which the improved flange spreader of the present invention has been connected.
Figure 3:
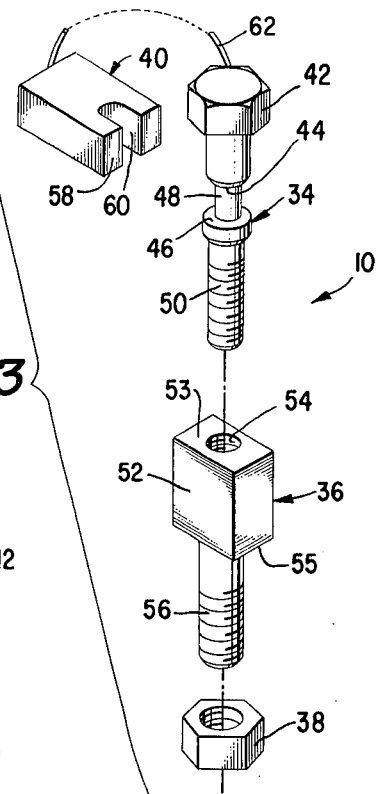
FIG. 3 is an exploded perspective view of the components of the improved flange spreader.

The novel flange spreader, designated generally as 10 is illustrated in FIGS. 2 and 3, and is designed for use in a conventional pipeline 12 shown in FIG. 1. The pipeline 12 as shown has an expansion loop 14 and embodies one or more flow control devices 16, mounted between successive pipeline sections 18 and 20. Section 18 has an annular flange 22 and section 20 has an annular flange 24, with each of the flanges 22 and 24 extending radially outwardly from the respective sections 18 and 20 and can be formed in place or integrally connected thereto as by welding. Each of the flanges 22 and 24 have a plurality of axially extending apertures 26 circumferentially spaced radially outwardly from the sections 18 and 20. When assembling the pipeline 12 the flanges 22 and 24 will be positioned to place the opposing apertures 26 in substantially axial alignment. A stud 28 extends through a pair of axially opposed apertures 26 and threadedly receives a nut 30 at either end. The nuts 30 are tightened to clamp the opposed flanges 22 and 24 and connected sections 18 and 20 together to assemble the pipeline 12. The flow control device 16, which is fitted with a pair of gaskets 32 at either end is mounted between the opposed flanges 22 and 24 in a leakproof manner.

Subsequent to the assembly thereof, the pipeline 12 will be subjected to various torsional, bending or compression forces, which the stud 28 connection to the flanges 22 and 24 are designed to resist. The nature and extent of the forces generated upon the stud 28 connection will depend on the quality of the pipeline 12 fabrication, its installation and the general nature of the terrain where the pipeline 12 is located. Usually, with proper care the initial installation of the sections 18 and 20 will be in reasonably axial alignment with each other and the stud 28 connection to nest the flow control device 16 between the adjacent flanges 22 and 24 will be easily made. In some installations; however, due to either poor piping installation initially or movement of the pipeline due to settling, etc. at a latter date, considerable axial misalignment can be induced. In such cases, large forces will have to be overcome in order to properly align the sections 18 and 20. Usually the more serious alignment problem will not arise until well after the initial installation, such as when the flow control device 16 may require inspection or replacement.

It is often necessary to spread the flanges 22 and 24 in order to remove the flow control device 16 mounted therebetween. The axial alignment of the sections 18 and 20 must be considered both before and after the spreading of the flanges 22 and 24. If proper care is not taken, the gaskets 32 and/or studs 28 can be damaged requiring their replacement, in addition to the time, the labor and the expense thereof. If either the alignment or the flange spreading becomes a problem, external aid such as tractor-pulled chain or hydraulic jack positioned between the flanges might have to be used to right the situation.

The preferred embodiment of the flange spreader 10 is illustrated in FIGS. 2 and 3, and include the four basic components of a jackscrew 34, a base 36, a base nut 38 and a jackscrew stop 40.

The jackscrew 34 has a bolt head 42 formed at one end thereof followed by an inward flange shoulder 44 which is spaced from a stop shoulder 46 by a stop annular recess 48. The remainder of the shank of the jackscrew 34 below the shoulder 46 is a threaded section 50.

The base 36 has a rectangular body 52 with a threaded bore 54 extending inwardly from the upper end 53 thereof. A threaded shank 56 extends outwardly and away from the lower end 55 of the rectangular body 52. The base nut 38 has an internal threaded diameter adapted to be threadedly received on the shank 56. Also, the base nut 38 may be sized to receive the same size wrench as would be used on the bolt head 42.

The jackscrew stop 40 is rectangularly shaped and at one of the narrow ends 58 is an inwardly extending slot 60, having an arcuate bottom of substantially the same diameter as the diameter of the recess 48. For safekeeping, the jackscrew stop 40 may be fitted with a retaining chain 62 which is fastened to the jackscrew 34 below the bolt head 42.

The flange spreaders 10 will be used in pairs, and as is shown in FIG. 2, the upper one can face leftward and the lower one can face rightward. While the flange spreaders 10 both could be used to face in the same direction by having them face in opposite directions opposing forces are better balanced and any slight variations due to manufacturing tolerances are automatically cancelled.

Figure 4:
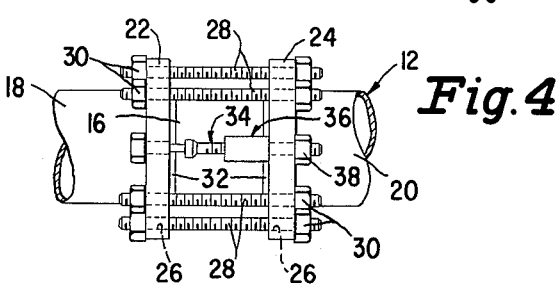
FIG. 4 is a side elevational view of the improved flange spreader clamped in place between the two opposed flanges.

The flange spreader is connected to the opposed pair of flanges 22 and 24 as illustrated in FIGS. 2 and 4 as a substitute for a previously removed pair of diametrically opposed studs 28. This can be done by inserting the threaded shank 56 of base 36 into and through the aperture 26 from the inside of the flange 22 or 24 (assume flange 22) to threadedly receive the base nut 38 on the outside of said flange, without undue tightening. The narrow dimension of the rectangular body 52 is placed in spaced relation to a flow control device 16 so as to lie perpendicular to a hypothetical radial line extending from the axis of pipeline 12. The jackscrew 34 passes from the outside through the aligned aperture 26 in the opposed flange 24 and has its threaded section 50 connected into the threaded bore 54 with the care taken not to turn the rectangular body 52 into the device 16 during the threading operation. The jackscrew 34 is advanced inwardly into the base 36 until the flange shoulder 44 has its leading edge flush with the inner face of the flange 24. The jackscrew stop 40 can be appended or affixed to the jackscrew by passing the front end 58 into the recess 48 to thereby insert the slot 60 into the recess 48 of the jackscrew 34, as illustrated in FIG. 2, one being in solid line representation and the other in dotted line representation. This is an optional step at this time, as the jackscrew stop 40 does not come into play until the flanges 22 and 24 must be spread. More importantly, the base nut 38 is tightened to firmly clamp the connected flange 22 (or 24) between itself (38) and the lower end 55 of the body 52. Such a connection of the flange spreader 10 as illustrated in FIGS. 2 and 4 will serve to hold the outer axial dimension of the flanges 22 and 24 equal to the distance set by the studs 28. In this position, the pair of flange spreaders also serve to clamp the sections 18 and 20 in axially aligned position.

Figure 5:
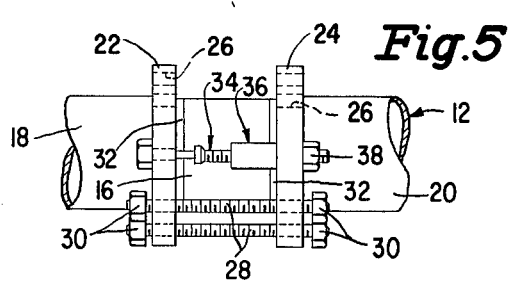
FIG. 5 is a side elevational view of the improved flange spreader clamped in place to permit the top studs to be removed and the bottom studs loosened.
Figure 8:
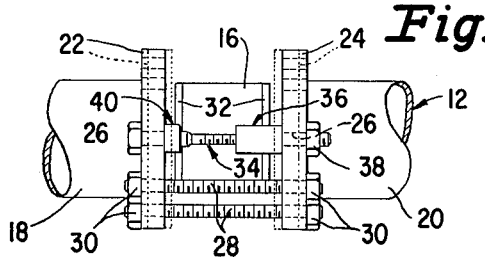
FIG. 8 is a side elevational view showing the flange spreader axially expanding the opposed flange pipeline sections.

Once the pair of flange spreaders 10 are clamped to the opposed flanges 22 and 24 the upper studs 28 may be completely removed and the lower studs 28 need only be loosened sufficiently to provide the necessary flange spreading clearance as is illustrated in FIGS. 5 or 8.

Figure 6:
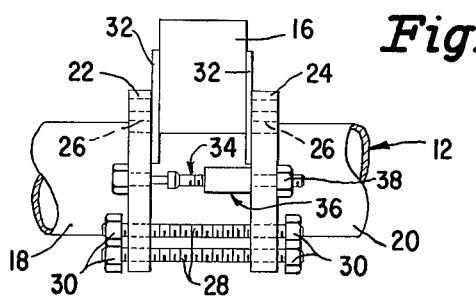
FIG. 6 is a side elevational view showing the removal of the flow control device and gasket thereof.

The pair of flange spreaders 10 hold the pipe sections 18 and 20 in aligned position to permit possible removal of the flow control device 16, as shown in FIG. 6 and along with the opposed sealing gaskets 32. This can be accomplished if the alignment is perfect. However, in most instances, this will not be possible as there most likely has been some shifting or exertion of pressure and therefore no forcing of the flow control device 16 should be attempted and its removal should not be made until after the spreading step set forth in FIG. 8 has been taken.

Figure 7:
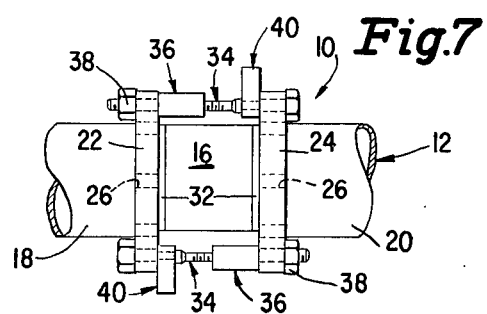
FIG. 7 is a top plan view showing the flange spreader with the jackscrew stop inserted.

If the jackscrew stops 40 had not been inserted as shown in FIG. 2, they will be appended or connected as illustrated in FIG. 7 upon interengaging the slot 60 thereof within the recess 48 as is illustrated in the top plan view, FIG. 7. This serves to dimensionally fix the axial distance on both the outer faces and the inner faces of the opposed flanges 22 and 24.

The flange spreading step is illustrated in FIG. 8 wherein the jackscrew will be backed off and rotated so as to move the jackscrew 34 axially away from the base 36 thus forcing the flanges 22 and 24 axially away from each other but in a controlled movement which retains the axially aligned position thereof. The amount of movement need not be great and it would be within the design limits of the pipeline 12, as for example, the expansion thereof due to temperature, so that such movement could easily be distributed to the expansional loop 14 shown in FIG. 1.

Figure 9:
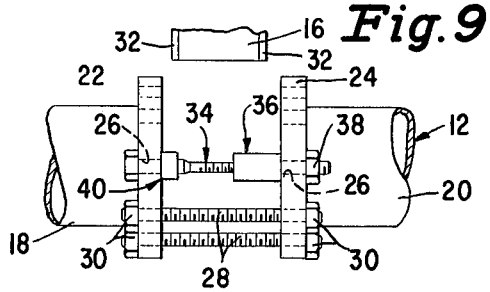
FIG. 9 is a side elevational view showing the flow control device removed from the expanded opposed flange pipeline sections.

After suitably spreading the flanges 22 and 24 the flow control device 16 and accompanying gaskets 32 would be free for removal as illustrated diagrammatically in FIG. 9, so that the same could be inspected or replaced.

Subsequent to returning the flow control device 16 to its position in the pipeline 12, the steps shown in FIGS. 1, and 4 through 9 would be substantially reversed so as to achieve reassembly of the pipeline 12. Thus, as illustrated in FIG. 1, the studs 28 would completely connect the opposed flanges 22 and 24 in secure position to sealingly mount the flow control device 16 therebetween.

It will be understood that various changes in the details, materials, arrangements of parts in operating conditions which have been herein described and illustrated in order to explain the nature of the invention may be made by those skilled in the art within the principles and scope of the invention.

Having thus set forth the nature of the invention, what is claimed herein is:

1. A flange spreader used for removal of a flow control device mounted between two opposing flanges of a pipeline, the flanges being clamped together by a plurality of studs, a pair of the flange spreaders to clamp the opposing flanges in axially aligned position as replacements for two of the studs and whereby all of the studs will be loosened and some of the studs will be removed to give access to the flow control device, the flange spreader comprising:
   a. a pair of members including a jackscrew and a base interconnected to each other to be axially expandable or contractable, and to initially hold the opposing flanges from axial expansion,
   b. the jackscrew threadedly connected to a base intermediate the opposing flanges,
   c. the base having a portion abutting the inner face of one of the flanges, d. the base having a threaded shank which extends through the said one flange,
e. a base nut threadedly connected to the shank at the outer face of the said one flange,
f. a jackscrew stop appended to the jackscrew to abut the inner face of the other flange, and
g. a head formed on the jackscrew disposed at the outer face of the said other flange whereby rotation of the jackscrew in one direction will clamp the external faces of the flanges between the head and the base nut thereof to cause axial contraction of the opposing flanges, and rotation in the opposite direction will clamp the inner faces of the flanges between the base and the jackscrew stop to cause axial expansion of the opposing flanges.

2. The combination claimed in claim 1 wherein:
a. one of the jackscrews is inserted into one of the flanges and the other jackscrew is inserted into the other flanges, whereby the base interconnected with the one jackscrew engages the other flange and the base interconnected with the other jackscrew engages the one flange.

3. A flange spreader comprising:
a. a jackscrew having a head at one end, a threaded section at the other end and a body portion therebetween,
b. a base having a body portion and a threaded shank extending axially outwardly from the body portion,
c. a threaded bore extending axially inwardly of the body portion of the base in the direction of the threaded shank,
d. a base nut threadedly connected to the threaded shank at an adjustable axial distance to the body portion of the base,
e. a stop member removably appended to the body portion of the jackscrew at a fixed axial distance from the head thereof, and
f. the threaded section of the jackscrew threadedly received in the threaded bore of the base, whereby rotation of the jackscrew will expand or contract the axial length of the flange spreader.

4. The combination claimed in claim 3 wherein:
a. the body portion of the base having a shoulder formed at the end thereof remote from the threaded bore thereof, and
b. the base nut being adjustable axially with respect to the shoulder of the body portion of the base.

* * * * *